(12) United States Patent
Güngör et al.

(10) Patent No.: US 10,747,945 B2
(45) Date of Patent: Aug. 18, 2020

(54) SYSTEMS AND METHODS FOR GENERATING AND RENDERING STYLIZED TEXT POSTS

(71) Applicant: Facebook, Inc., Menlo Park, CA (US)

(72) Inventors: Cemre Güngör, San Francisco, CA (US); Linda Linlan Zhang, San Jose, CA (US); Nathan Edward Butler, San Francisco, CA (US); Kory Matthew Westerhold, Palo Alto, CA (US); Karla Cole, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/838,694

(22) Filed: Dec. 12, 2017

(65) Prior Publication Data

US 2019/0179881 A1    Jun. 13, 2019

(51) Int. Cl.
| | | |
|---|---|---|
| G06F 17/21 | (2006.01) |
| G06F 40/151 | (2020.01) |
| G06Q 50/00 | (2012.01) |
| H04W 4/12 | (2009.01) |
| G06F 40/103 | (2020.01) |
| G06F 40/109 | (2020.01) |
| G06F 40/163 | (2020.01) |

(52) U.S. Cl.
CPC .......... *G06F 40/151* (2020.01); *G06F 40/103* (2020.01); *G06F 40/109* (2020.01); *G06F 40/163* (2020.01); *G06Q 50/01* (2013.01); *H04W 4/12* (2013.01)

(58) Field of Classification Search
CPC .................. G06F 17/2264; G06F 17/2294
USPC ......................................... 715/256
See application file for complete search history.

(56) References Cited

U.S. PATENT DOCUMENTS

| | | | | |
|---|---|---|---|---|
| 9,971,854 B1* | 5/2018 | Bowen | .................... | G06F 17/50 |
| 10,140,392 B1* | 11/2018 | Bowen | .................... | G06F 17/50 |
| 2013/0066947 A1* | 3/2013 | Ahmad | .................... | G06F 9/451 |
| | | | | 709/203 |
| 2013/0204714 A1* | 8/2013 | Gilliland | ............ | G06Q 30/0276 |
| | | | | 705/14.72 |
| 2016/0004672 A1* | 1/2016 | Sakunkoo | ............... | H04L 51/08 |
| | | | | 715/269 |
| 2016/0021047 A1* | 1/2016 | Sawato | .................. | H04L 51/20 |
| | | | | 455/456.3 |
| 2016/0092410 A1* | 3/2016 | Martin | .................. | G06F 17/214 |
| | | | | 715/269 |
| 2016/0105691 A1* | 4/2016 | Zucchetta | .......... | H04N 21/2143 |
| | | | | 725/82 |
| 2016/0357717 A1* | 12/2016 | Metz | ...................... | G06F 17/212 |
| 2017/0032269 A1* | 2/2017 | Portilla | .................. | G06N 7/005 |
| 2018/0270446 A1* | 9/2018 | Weil | ................. | H04N 21/42203 |

* cited by examiner

*Primary Examiner* — Scott T Baderman
*Assistant Examiner* — Hassan Mrabi
(74) *Attorney, Agent, or Firm* — Sheppard Mullin Richter & Hampton LLP

(57) ABSTRACT

Systems, methods, and non-transitory computer-readable media can receive a set of text entered by a composing user. A style identifier associated with a pre-defined style is received. The set of text and the style identifier are transmitted to a viewing user computing device for rendering of a stylized text post on the viewing user computing device based on the set of text and the style identifier.

17 Claims, 10 Drawing Sheets

SYSTEMS AND METHODS FOR GENERATING AND RENDERING STYLIZED TEXT POSTS

FIELD OF THE INVENTION

The present technology relates to the field of social networking systems. More particularly, the present technology relates to systems and methods for generating and rendering stylized text posts.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

SUMMARY

Various embodiments of the present disclosure can include systems, methods, and non-transitory computer readable media configured to receive a set of text entered by a composing user. A style identifier associated with a pre-defined style is received. The set of text and the style identifier are transmitted to a viewing user computing device for rendering of a stylized text post on the viewing user computing device based on the set of text and the style identifier.

In an embodiment, the style identifier comprises a set of characters.

In an embodiment, the style identifier is transmitted to the viewing user computing device as metadata associated with the stylized text post.

In an embodiment, the pre-defined style comprises one or more style settings to be applied to the stylized text post.

In an embodiment, the one or more style settings comprise one or more background settings to be applied to the stylized text post.

In an embodiment, the one or more style settings comprise one or more text settings to be applied to the stylized text post.

In an embodiment, the stylized text post is not associated with any image or video.

In an embodiment, the pre-defined style is a pre-defined style selected by the composing user from a plurality of pre-defined style options.

In an embodiment, an indication is received that the stylized text post is to be presented in a news feed comprising a plurality of content items displayed on the viewing user computing device. The transmitting the set of text and the style identifier to the viewing user computing device is performed in response to the receiving the indication that the stylized text post is to be presented on the news feed displayed on the viewing user computing device In an embodiment, an animation associated with the stylized text post is initiated when the stylized text post comes into view within the news feed displayed on the viewing user computing device.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
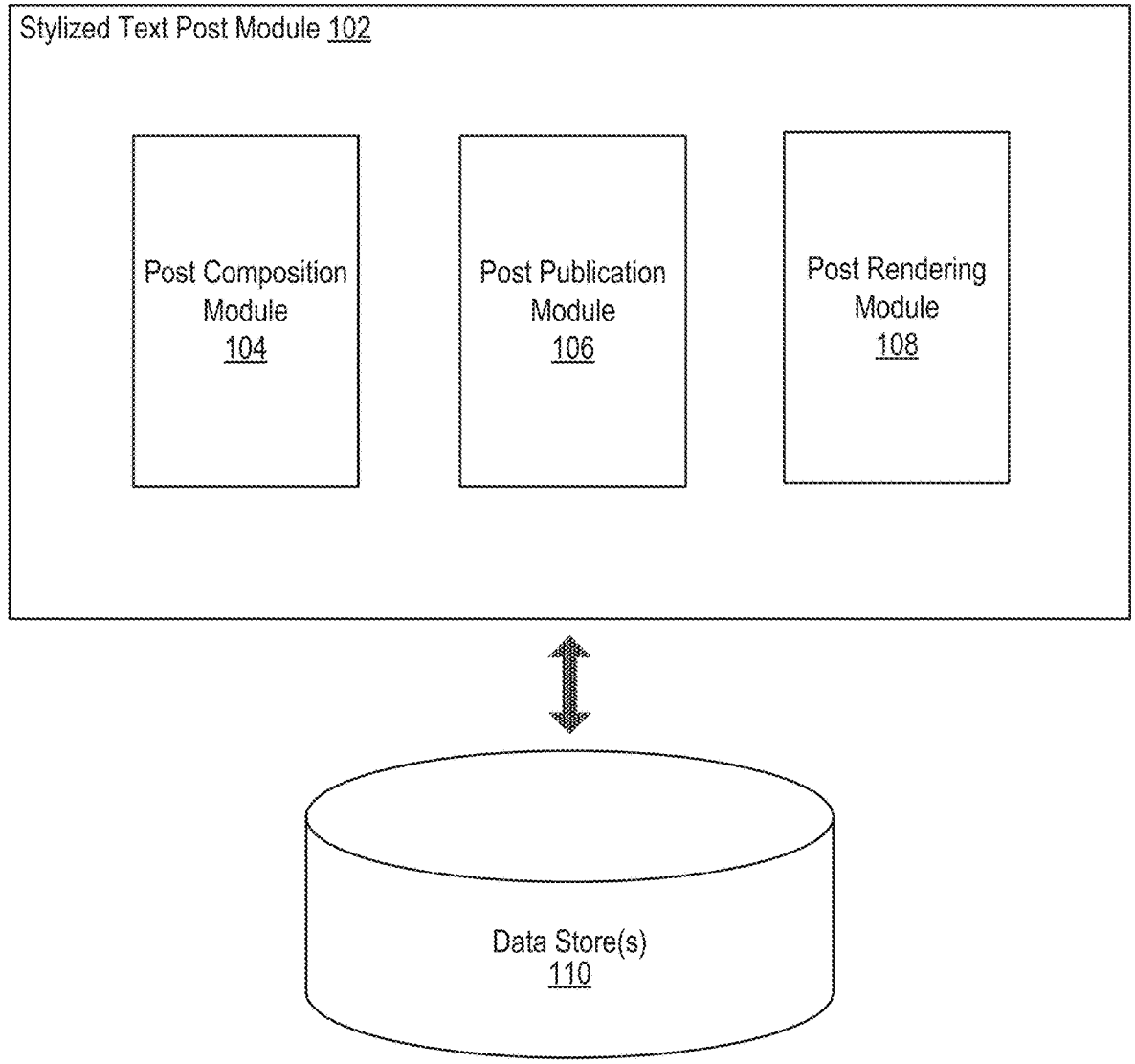
FIG. 1 illustrates an example system including a stylized text post module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Stylized Text Posts

People use computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. Content items can be posted to a social networking system as content posts that can be viewed by other users of the social networking system.

Users of a social networking system may be provided with various tools and/or features to create interesting content posts. For example, users can be provided with a composer tool in which the user can enter text, links, images, and/or videos to be shared with other users on the social networking system. While text-based content posts are an important feature of social networking systems, content posts that feature only text may be less interesting than content posts that are arguably more visually appealing. As such, users may be provided with tools to make text-based content posts more visually appealing. This may be accomplished, for example, by adding color or images or other graphical elements to the text-based content post.

Under conventional approaches, content posts which include both textual elements and graphical elements, such as text overlaid on an image, text on a stylized background, or stylized text, to name a few examples, may be flattened into an image and the image can then be posted to the social networking system. Similarly, under some conventional approaches, an animated effect may be achieved by generating a video of animated text and/or animated background, and the video can be posted to the social networking system. While these approaches may offer certain advantages, there are also drawbacks. For example, flattening a content item with multiple elements into a single image or video is a destructive process that loses certain content in the flattening process. Another disadvantage is found in the fact that users posting a content post must generally upload the content post to a server, and viewing users must download the content post in order to view it. Uploading and/or downloading an image and/or a video typically requires significantly more bandwidth and computing resources than uploading and/or downloading text (i.e., strings).

An improved approach rooted in computer technology overcomes the foregoing and other disadvantages associated with conventional approaches specifically arising in the realm of computer technology. In general, a user can create a stylized text post. A stylized text post can include a set of text and a pre-defined style. A pre-defined style can include one or more style settings. The one or more style settings can include one or more of: one or more background colors, one or more background images, text alignment, text font, font size, font weight, font style, font color, text animation, and the like. In various embodiments, the user can create a stylized text post by entering text into a composer and selecting a pre-defined style from a plurality of pre-defined styles. Each pre-defined style can include a pre-packaged set of style settings, such that the entered text is stylized according to the pre-defined style selected by the user. Each pre-defined style can be associated with a style identifier. In various embodiments, the style identifier may be a string (i.e., a sequence of text characters).

When a composing user creates a stylized text post, the composing user can, in various embodiments, post the stylized text post to a social networking system to be viewed by other users on the social networking system. Posting the stylized text post may comprise uploading the stylized text post to a remote computing device, such as a server, over a network. However, rather than uploading a flattened image or video of the stylized text post, as is the case with certain conventional approaches, the presently disclosed approach can upload a set of text and a style identifier associated with the stylized text post. When the stylized text post is to be presented to a viewing user on the viewing user's computing device, the viewing user can be provided with the set of text and the style identifier. In other words, the viewing user can download the set of text and the style identifier to his or her computing device. The viewing user's computing device can use the set of text and the style identifier to dynamically render the stylized text post. As such, rather than uploading an image or video, the composing user uploads a string comprising the set of text and the style identifier and the viewing user downloads the string. The viewing user's computing device can then dynamically render the stylized text post based on the set of text and the style identifier. This represents a significant savings in utilization of bandwidth and other computing resources while providing other related advantages. Other features and advantages of the present disclosure are described in greater detail herein.

FIG. 1 illustrates an example system 100 including an example stylized text post module 102, according to an embodiment of the present disclosure. The stylized text post module 102 can be configured to receive a set of text entered by a user (e.g., a composing user). The set of text can include one or more characters entered by a user for inclusion in a stylized text post. In various embodiments, the stylized text post module 102 can provide a composer window in a user interface to allow a user to enter text. In one embodiment, the user may be entering the set of text to compose and publish a stylized text post. The stylized text post module 102 can also be configured to receive a selection of a pre-defined style to apply to the stylized text post. In certain embodiments, the user may be presented with a plurality of pre-defined styles. Each pre-defined style may result in a particular visual effect for the stylized text post. For example, each pre-defined style may define one or more background settings for the stylized text post (e.g., a background color or multiple background colors, a gradient direction, a background image, etc.) and may define one or more text settings to be applied to the set of text (e.g., a font, a font color, a font size, text alignment, a weight and/or style for the font, etc.). The user may be presented with a user interface in which the user is presented with a plurality of pre-defined style choices and can select a particular pre-defined style to apply to the stylized text post.

In certain embodiments, each pre-defined style may be associated with a style identifier. In one embodiment, a style identifier may be a set of characters (e.g., a numerical identifier). When the user has completed composing his or her stylized text post, the user can choose to post the stylized text post to a social networking system. When the user posts the stylized text post to the social networking system, the user's computing device can transmit the set of text and the style identifier to a remote computing device (e.g., a social networking system server). In this example, the social networking system server can receive the stylized text post comprising the set of text and the style identifier. In an embodiment, publication of a stylized text post can comprise transmission of one or more strings (e.g., the set of text and the style identifier), but does not comprise flattening of the text into an image or video and does not comprise transmission of an image or video.

When a user on a social networking system, i.e., a viewing user, is to be presented with another user's stylized text post, the stylized text post module 102 can transmit to the viewing user's computing device a set of text and a style identifier associated with the stylized text post. The viewing user's computing device can receive the set of text and the style identifier. In one embodiment, as discussed above, both the set of text and the style identifier may be strings, such that the transmission of the stylized text post from, for example, a social networking system server to the viewing user's computing device comprises a transmission of strings, and does not comprise flattening of the set of text into an image or a video and/or transmission of an image or video. The stylized text post module 102 can be further configured to dynamically render the stylized text post on the viewing user's computing device based on the set of text and the style identifier. For example, the stylized text post module 102 can be configured to identify one or more style settings associated with the style identifier (e.g., one or more background settings and/or one or more text settings), and to apply the one or more style settings to the set of text in order to render the stylized text post.

As shown in the example of FIG. 1, the stylized text post module 102 can include a post composition module 104, a post publication module 106, and a post rendering module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the stylized text post module 102 can be implemented in any suitable combinations.

In some embodiments, the stylized text post module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the stylized text post module 102 can be implemented, in part or in whole, as software running on one or more computing devices or systems, such as on a user or client computing device. For example, the stylized text post module 102, or at least a portion thereof, can be implemented as or within an application (e.g., app), a program, or an applet, etc., running on a user computing device or a client computing system, such as the user device 610 of FIG. 6. In another example, the stylized text post module 102, or at least a portion thereof, can be implemented using one or more computing devices or systems that include one or more servers, such as network servers or cloud servers. In some instances, the stylized text post module 102 can, in part or in whole, be implemented within or configured to operate in conjunction with a social networking system (or service), such as the social networking system 630 of FIG. 6. It should be understood that there can be many variations or other possibilities.

The stylized text post module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social engagements, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the stylized text post module 102. For example, the data store 110 can store style identifiers, one or more style settings associated with each style identifier, user preferences, stylized text posts, and the like. It is contemplated that there can be many variations or other possibilities.

The post composition module 104 can be configured to receive user input for composition of a stylized text post. The post composition module 104 can be configured to provide a user interface via which a composing user can enter a set of text for a stylized text post. The post composition module 104 can also be configured to receive a selection of a pre-defined style from a plurality of pre-defined styles. In certain embodiments, when the composing user selects a particular pre-defined style, the post composition module 104 can generate a preview of the stylized text post based on the selected pre-defined style. The composing user can select each pre-defined style of the plurality of pre-defined styles to view previews for each pre-defined style. The composing user can then post the stylized text post in order to share the stylized text post with one or more other users (e.g., one or more other users on a social networking system). When the composing user posts the stylized text post, the post composition module 104 can identify a style identifier associated with the pre-defined style selected by the composing user. The post composition module 104 can transmit the set of text entered by the composing user and the style identifier to a remote computing device (e.g., a social networking system server) so that the stylized text post can be rendered on other users' computing devices. The post composition module 104 is described in greater detail herein with reference to FIG. 2.

The post publication module 106 can be configured to publish a stylized text post. As discussed above, when a composing user posts a stylized text post, the composing user's computing device can transmit a set of text and a style identifier associated with the stylized text post. The post publication module 106 can be configured to receive the set of text and the style identifier associated with a stylized text post. When another user, i.e., a viewing user, is to be presented with the stylized text post, the post publication module 106 can transmit the set of text and the style identifier associated with the stylized text post to the viewing user's computing device.

The post rendering module 108 can be configured to render a stylized text post based on a set of text and a style identifier associated with the stylized text post. The post rendering module 108 can be configured to receive the set of text and the style identifier for a stylized text post. The post rendering module 108 can also be configured to identify one or more style settings, such as one or more background settings and/or one or more text settings, associated with the style identifier. The post rendering module 108 can render the stylized text post by applying the one or more style settings to the set of text. The post rendering module 108 will be described in greater detail herein with reference to FIG. 3.

Figure 2:
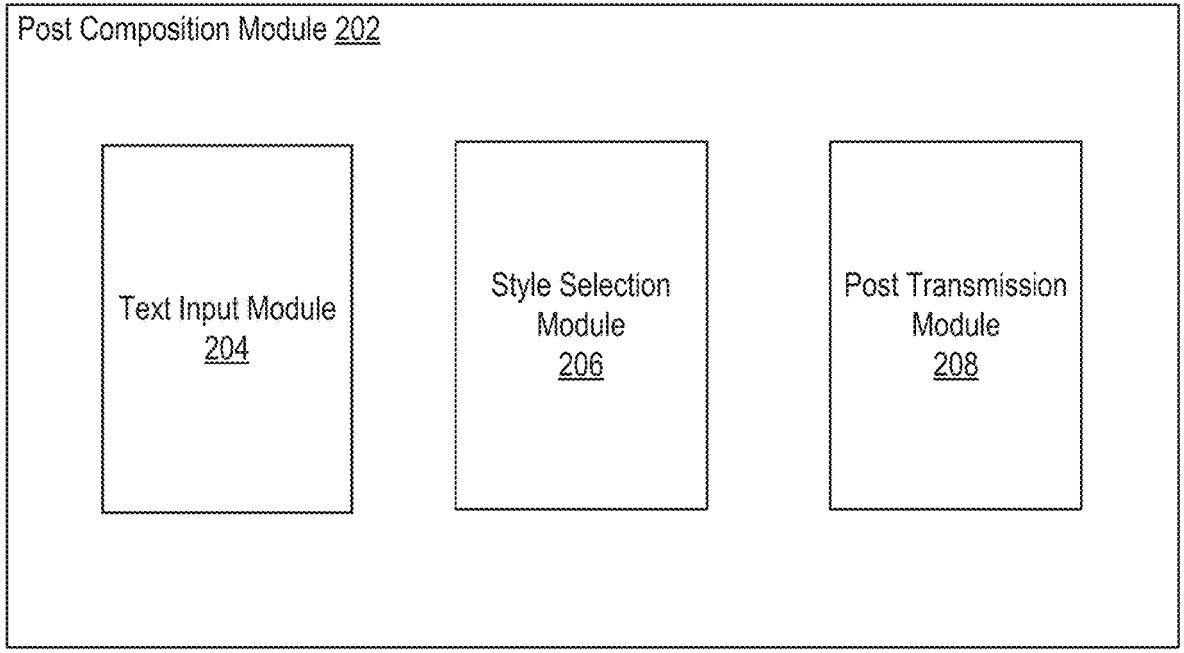
FIG. 2 illustrates an example post composition module, according to various embodiments of the present disclosure.

FIG. 2 illustrates an example post composition module 202 configured to compose and upload a stylized text post, according to an embodiment of the present disclosure. In some embodiments, the post composition module 104 of FIG. 1 can be implemented as the post composition module 202. As shown in the example of FIG. 2, the post composition module 202 can include a text input module 204, a style selection module 206, and a post transmission module 208.

The text input module 204 can be configured to receive a set of text entered by a user for a stylized text post. The text input module 204 can be configured to provide a composer window in a user interface that allows a user to enter text. In various embodiments, the composer window may also allow a user to add additional elements to a stylized text post. These additional elements can include, for example, tags of other users in the stylized text post, a location tag associated with the stylized text post, and the like. In certain embodiments, the set of text entered by a user for a stylized text post can include not only traditional textual characters, but may also include symbol characters, such as emojis. As such, the text input module 204 can be configured to receive a set of text that can include, for example, letters, numbers, punctuation, and/or symbol characters.

The style selection module 206 can be configured to receive a selection of a pre-defined style to be used when generating a stylized text post. In certain embodiments, a user composing a stylized text post can be presented with a plurality of pre-defined style options. Each pre-defined style can be associated with one or more visual settings to be applied to the stylized text post. For example, a pre-defined style can include one or more background settings. Background settings can define a background portion of a stylized text post. For example, the background settings can specify a solid background having a particular color, a gradient background transitioning from a first color to a second color, a gradient direction, a particular image and/or pattern to be used as the background, and the like. In various embodiments, a pre-defined style can include one or more text settings. The one or more text settings can define, for example, a font, a font color, a text size, a text weight, a text style (e.g., italics, underline, strikethrough), a text alignment (e.g., centered, left, right, top, bottom), and/or an animation to be applied to the text. In certain embodiments, one or more text settings may be adjustable based on the set of text entered by a user. For example, as a user enters more text, font size may be reduced so that the entered text can fit within fixed and/or maximum dimensions for a stylized text post. In various embodiments, a pre-defined style may be non-editable such that the pre-defined style defines a fixed set of style settings that cannot be modified by a user. In other embodiments, a pre-defined style may be editable by a user.

The user can select a particular pre-defined style from the plurality of pre-defined style options. When a user selects a particular pre-defined style, the style selection module 206 can be configured to generate a preview of the stylized text post with the particular pre-defined style applied. In this way, the user can select various pre-defined styles from the plurality of pre-defined style options, view previews of what his or her stylized text post will look like, and then select the pre-defined style that he or she likes best. In certain embodiments, if a user has not yet entered any text for the stylized text post, a preview can be generated using a default set of text. For example, when a user is presented with a composer window, the composer window can include the default text "What's on your mind?" As a user selects various pre-defined styles, a preview of each pre-defined style can be generated using the default text.

In certain embodiments, a default pre-defined style can be initially applied when a user begins composing a stylized text post. In various embodiments, the default pre-defined style can be randomly selected. In other embodiments, the default pre-defined style can be determined based on previous stylized text posts generated by the user. For example, the default pre-defined style can be a pre-defined style most often used by the user, or the pre-defined style used by the user in the user's most recent stylized text post. In other embodiments, the default pre-defined style can be selected and/or set according to a user preference.

In certain embodiments, multiple pre-defined styles can be selected for and applied to a stylized text post. In one embodiment, styles can be layered such that multiple styles can be layered on top of one another. For example, a user can select a background style defining one or more background settings, and then a frame style defining a frame to be layered on top of the background, and then a text style defining one or more text settings to be applied to text layered on top of the background and the frame.

The post transmission module 208 can be configured to upload a stylized text post for publication to one or more users. As discussed above, a stylized text post can include a set of text (i.e., one or more characters) and a pre-defined style. Each pre-defined style can be associated with a style identifier, which can comprise one or more characters. When a user posts a stylized text post, the post transmission module 208 can be configured to transmit the set of text and the style identifier to a remote computing device, such as a social networking system server. In certain embodiments, the style identifier can be transmitted as metadata associated with the stylized text post.

One benefit of transmitting a stylized text post in this manner is that, in various embodiments, this allows a stylized text post to be modified after a user has posted the stylized text post. In certain embodiments, an image and/or a video posted by a user may not be editable after posting, whereas text posted by a user can be edited after posting. Since stylized text posts are transmitted in a non-destructive manner that preserves text information, a composing user can modify the set of text for the stylized text post even after the stylized text post has been posted/published. The post transmission module 208 can transmit the updated set of text to one or more viewing users to render the updated stylized text post.

In various embodiments, the stylized text post can be a content post to be posted to a page on a social networking system associated with the composing user. In various embodiments, the stylized text post can be a content post to be posted to one or more feeds associated with one or more other users on a social networking system. In various embodiments, the stylized text post can be a comment and/or a response to an existing content post on a social networking system.

Figure 3:
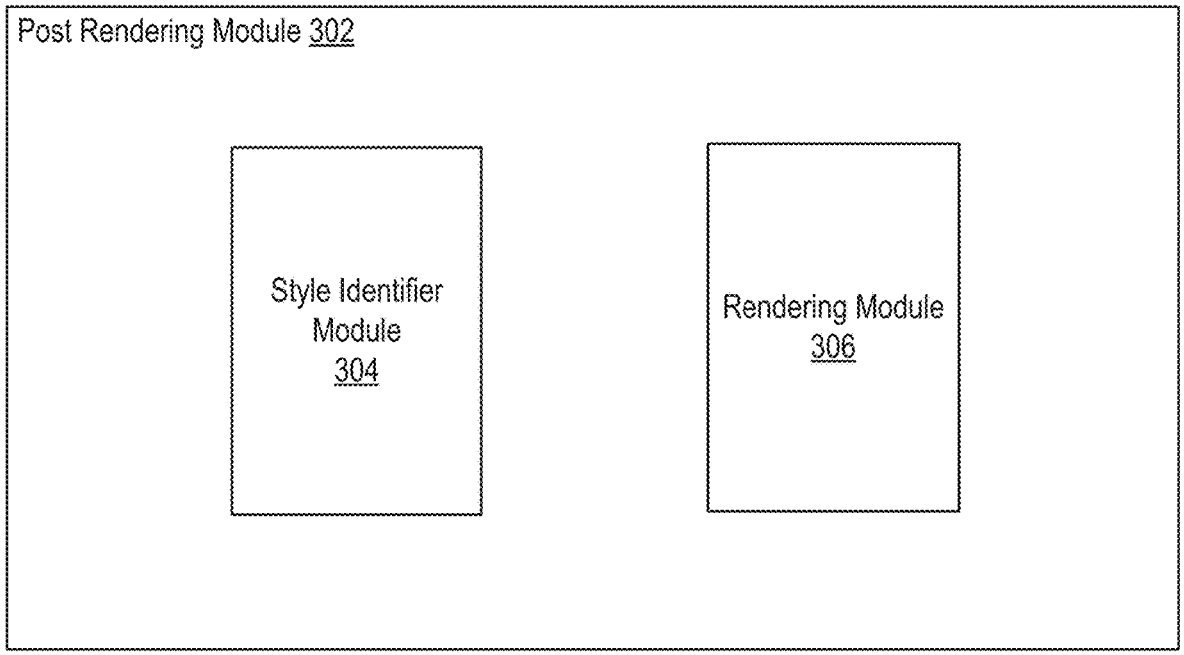
FIG. 3 illustrates an example post rendering module, according to various embodiments of the present disclosure.

FIG. 3 illustrates an example post rendering module 302 configured to retrieve and render a stylized text post, according to an embodiment of the present disclosure. In some embodiments, the post rendering module 108 of FIG. 1 can be implemented as the post rendering module 302. As shown in the example of FIG. 3, the post rendering module 302 can include a style identifier module 304 and a rendering module 306.

The style identifier module 304 can be configured to identify one or more style settings based on a style identifier. As discussed above, a stylized text post can be associated with a set of text to be presented in the stylized text post and a style identifier. The post rendering module 302 can be configured to receive the set of text and the style identifier for a stylized text post. Each style identifier can be associated with one or more style settings, such as one or more background settings and/or one or more text settings, as described above. The style identifier module 304 can be configured to identify and/or retrieve the one or more style settings associated with a particular style identifier.

The rendering module 306 can be configured to dynamically render a stylized text post on a user computing device based on a set of text and a style identifier. The rendering module 306 can be configured to receive the one or more style settings associated with a particular style identifier and render the stylized text post by applying the one or more style settings to the set of text. In this way, rather than downloading a flattened image or video, a viewing user's computing device can download a set of strings (e.g., the set of text and the style identifier), and dynamically render the stylized text post. In certain embodiments, a stylized text post is rendered locally on a viewing user computing device based on a set of text and a style identifier. As such, in various embodiments, one or more features and/or functions of the rendering module 306 can be implemented on a viewing user computing device.

By dynamically rendering a stylized text post on a viewing user's device, rather than creating/downloading a flattened image or video, stylized text posts can be rendered in a customized manner based on a viewing user's computing device. For example, stylized text posts can be rendered in a way that is consistent with one or more visual characteristics of a viewing user's computing device. For example, in certain embodiments, the rendering module 306 can render the stylized text post using one or more native fonts and/or characters associated with a computing device on which the stylized text post is being rendered. An example of such a scenario may involve Android devices and iOS devices, as devices running the Android operating system may use different native fonts from devices running the iOS operating system. Similarly, in certain embodiments, the rendering module 306 can render the stylized text post using one or more symbol characters that are native to the computing device on which the stylized text post is being rendered (e.g., emojis may look slightly different on Android devices and iOS devices).

Dynamic rendering on a viewing user's computing device also allows for stylized text posts to be rendered according to viewing user preferences or needs. For example, certain style settings can be modified or disabled for a particular viewing user. One scenario in which this may be particularly useful is to customize viewing settings for a user based on accessibility requirements for the user. This would not be possible using a flattened, pre-rendered image that is transmitted to and presented on the viewing user's computing device.

In certain embodiments, a stylized text post can include one or more animations. For example, the set of text can be rendered with an animation effect (e.g., a typewriter effect that sequentially displays each character in the set of text as if being typed in real-time). In certain embodiments, the rendering module 306 can be configured to initiate an animation associated with a stylized text post when the stylized text post comes into view on a viewing user's computing device. For example, if a viewing user is scrolling through a news feed with a plurality of content posts, a first stylized text post may initially be off-screen and not displayed on the viewing user's computing device. As the viewing user scrolls through his or her feed, the first stylized text post may come into view, and the rendering module 306 can initiate an animation associated with the first stylized text post.

Figure 4A:
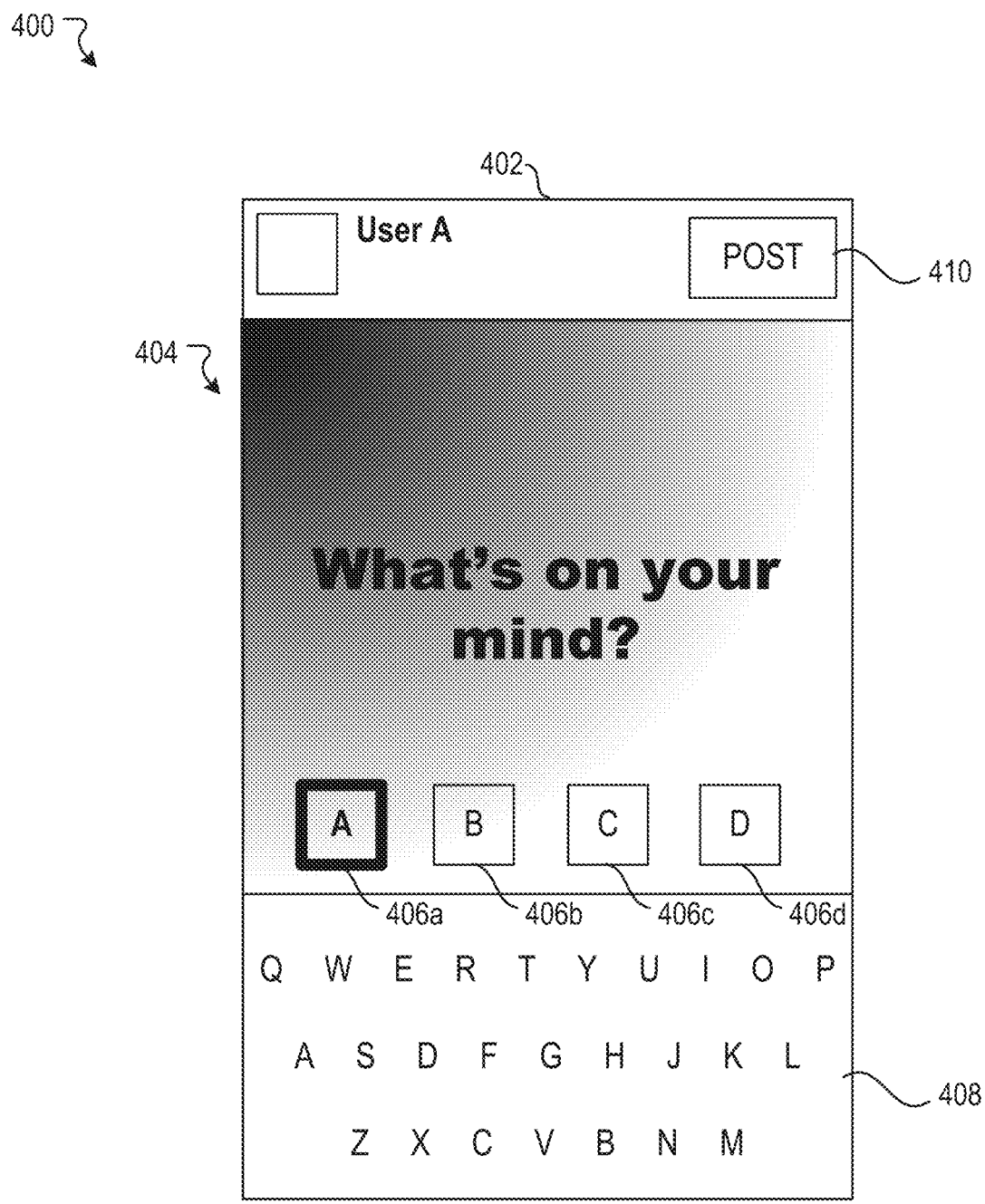
FIGS. 4A and 4B illustrate an example scenario associated with composing a stylized text post, according to an embodiment of the present disclosure.
Figure 4B:
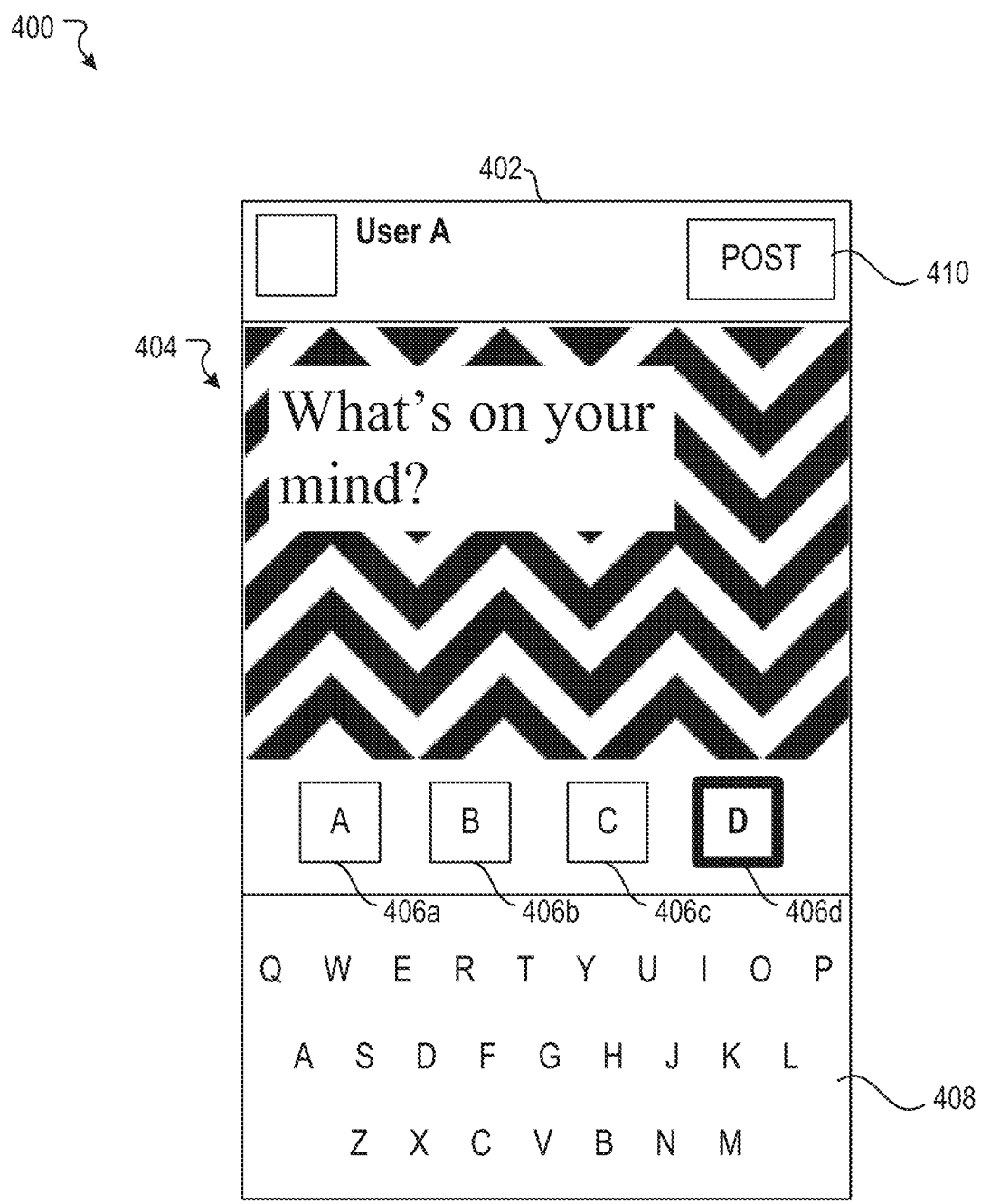

FIGS. 4A and 4B illustrate an example scenario 400 associated with composing a stylized text post, according to an embodiment of the present disclosure. The example scenario 400 includes a user interface presenting a composer window 402 for a user, User A. The composer window 402 includes a display portion 404, four pre-defined style options 406*a-d*, and a keyboard 408. A composing user can enter text for the stylized text post using the keyboard 408, and can select any of the pre-defined style options 406*a-d*. The display portion 404 provides a preview of what the stylized text post will look like with a particular style applied. In FIG. 4A, the user has selected a pre-defined style A, and the display portion 404 provides a preview of the stylized text post with the pre-defined style A applied. In the example scenario 400, the pre-defined style A comprises one or more style settings which specify a background gradient from the top left corner to the top right corner, centered text that is bolded in a particular font with a particular font size.

In FIG. 4B, the user has selected a pre-defined style D. The display portion 404 provides a preview of the stylized text post with the pre-defined style D applied. In the example scenario 400, the pre-defined style D comprises one or more style settings which specify a chevron patterned background, with text aligned in the upper left hand corner in a Times New Roman font. When the user has entered text for the stylized text post and selected a pre-defined style, the user can post the stylized text post by selecting a "post" button 410. Upon selection of the "post" button, a set of text and a style identifier associated with the stylized text post can be transmitted to the stylized text post module 102 so that the stylized text post can be published through a social networking system to other users as described above.

Figure 5A:
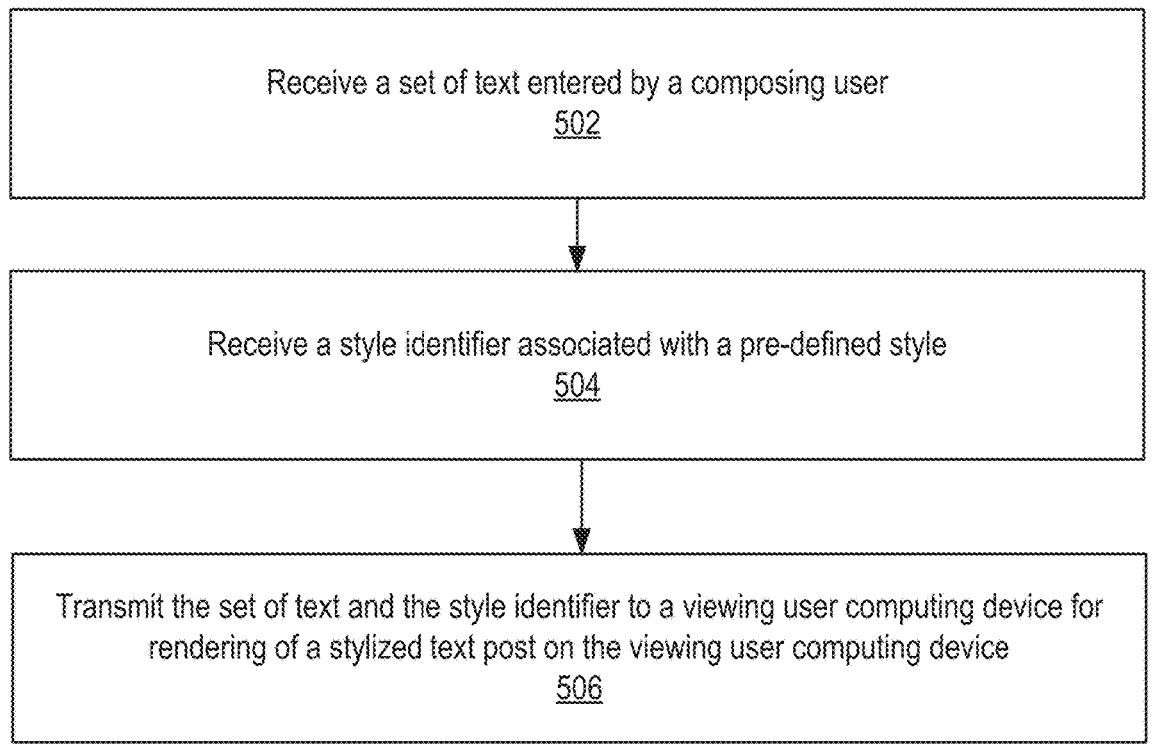
FIG. 5A illustrates an example method associated with generating stylized text posts, according to an embodiment of the present disclosure.

FIG. 5A illustrates an example method 500 associated with generating stylized text posts, according to an embodiment of the present disclosure. It should be appreciated that there can be additional, fewer, or alternative steps performed in similar or alternative orders, or in parallel, within the scope of the various "embodiments discussed herein unless otherwise stated.

At block 502, the example method 500 can receive a set of text entered by a composing user. At block 504, the example method 500 can receive a style identifier associated with a pre-defined style. At block 506, the example method 500 can transmit the set of text and the style identifier to a viewing user computing device for rendering of a stylized text post on the viewing user computing device.

Figure 5B:
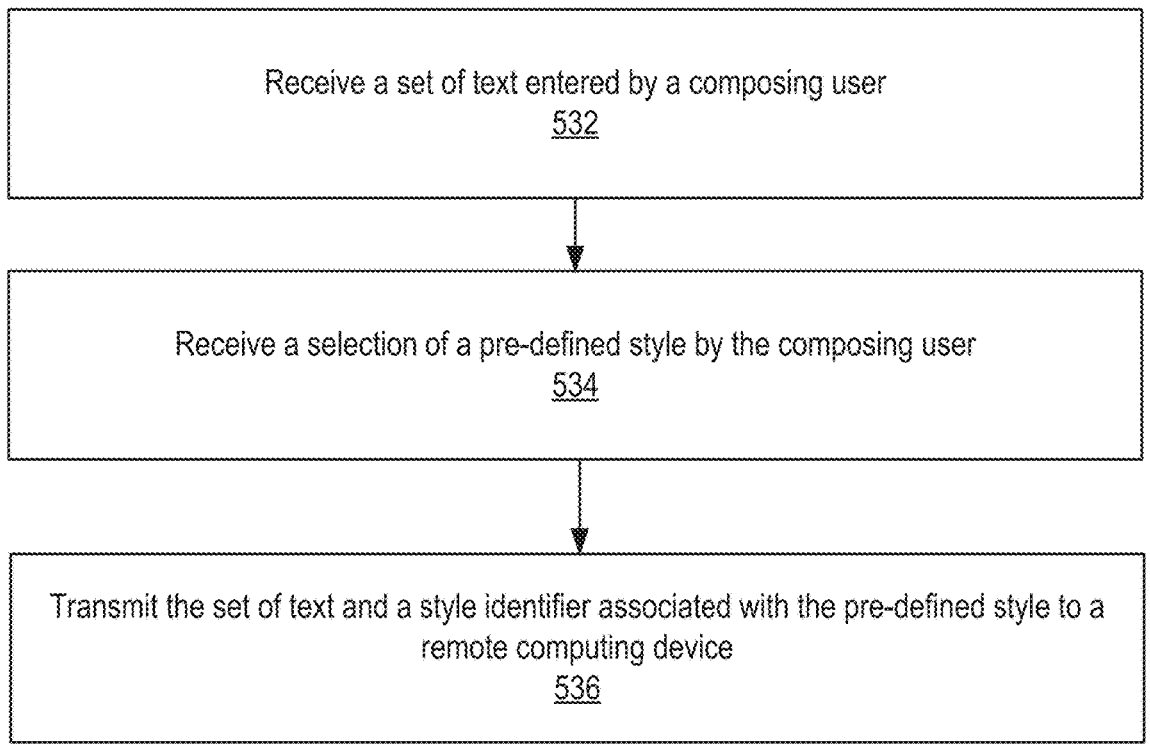
FIG. 5B illustrates an example method associated with composing a stylized text post, according to an embodiment of the present disclosure.

FIG. 5B illustrates an example method 530 associated with composing a stylized text post, according to an embodiment of the present disclosure. It should be appreciated that there can be additional, fewer, or alternative steps performed in similar or alternative orders, or in parallel, within the scope of the various "embodiments discussed herein unless otherwise stated.

At block 532, the example method 530 can receive a set of text entered by a composing user. At block 534, the example method 530 can receive a selection of a pre-defined style by the composing user. At block 536, the example method 530 can transmit the set of text and a style identifier associated with the pre-defined style to a remote computing device.

Figure 5C:
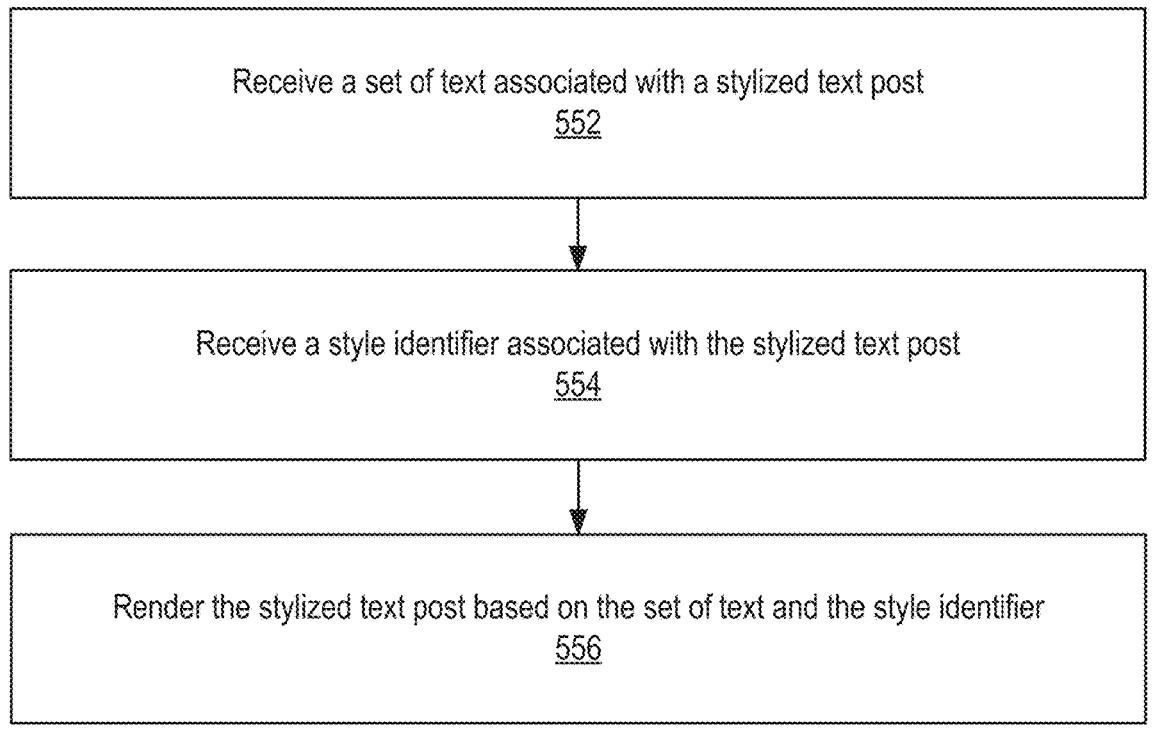
FIG. 5C illustrates an example method associated with rendering a stylized text post, according to an embodiment of the present disclosure.

FIG. 5C illustrates an example method 550 associated with rendering a stylized text post, according to an embodiment of the present disclosure. It should be appreciated that there can be additional, fewer, or alternative steps performed in similar or alternative orders, or in parallel, within the scope of the various embodiments discussed herein unless otherwise stated.

At block 552, the example method 550 can receive a set of text associated with a stylized text post. At block 554, the example method 550 can receive a style identifier associated with the stylized text post. At block 556, the example method 550 can render the stylized text post based on the set of text and the style identifier.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
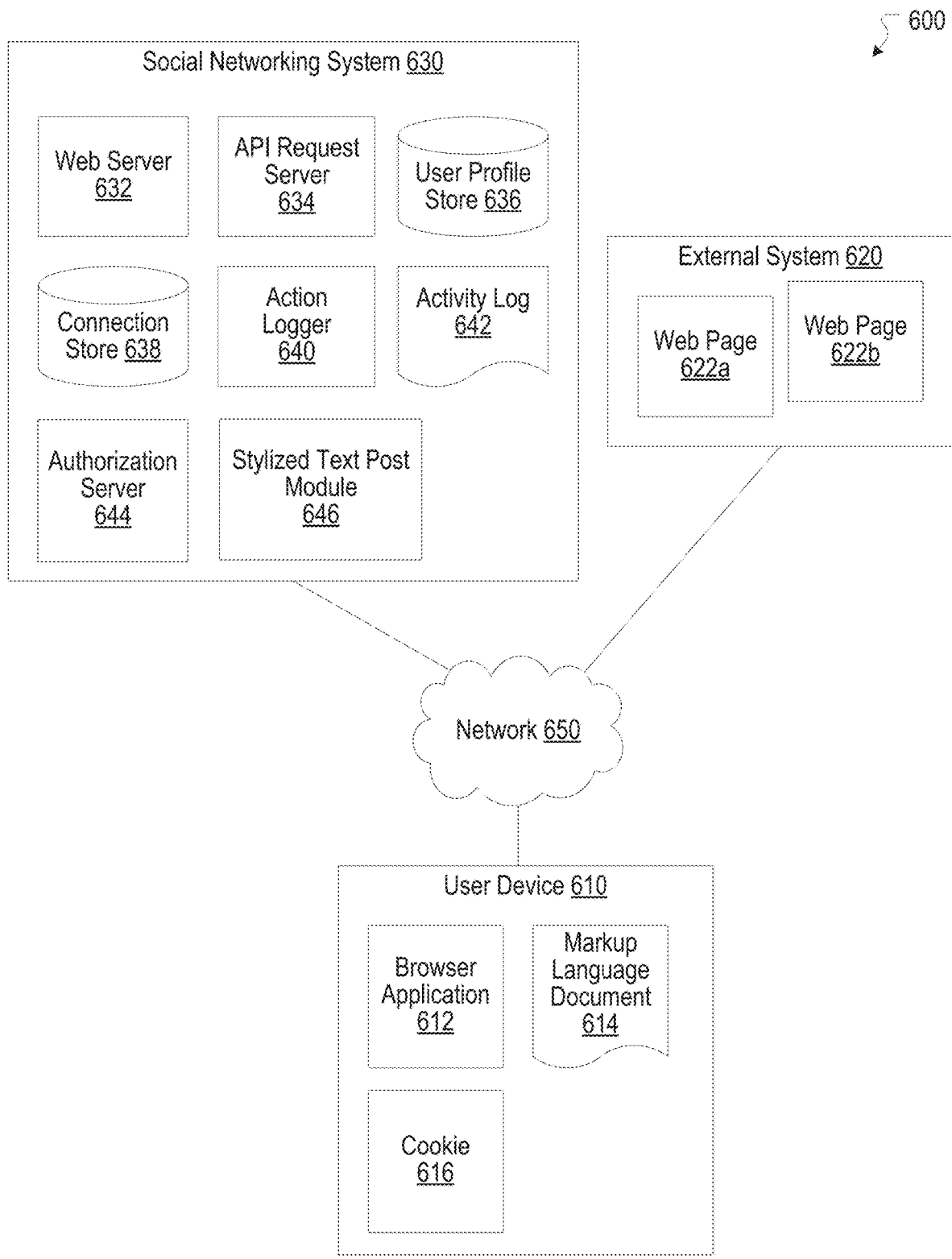
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing engagements between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and engagements with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and engagements.

The social networking system 630 also includes user-generated content, which enhances a user's engagements with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the engagement of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the engagements and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's engagement with an external system 620 from the web server 632. In this example, the external system 620 reports a user's engagement according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing engagements between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a stylized text post module 646. The stylized text post module 646 can, for example, be implemented as the stylized text post module 102, as discussed in more detail herein. As discussed previously, it should be appreciated that there can be many variations or other possibilities. For example, in some embodiments, one or more functionalities of the stylized text post module 646 can be implemented in the user device 610.

Hardware Implementation

Figure 7:
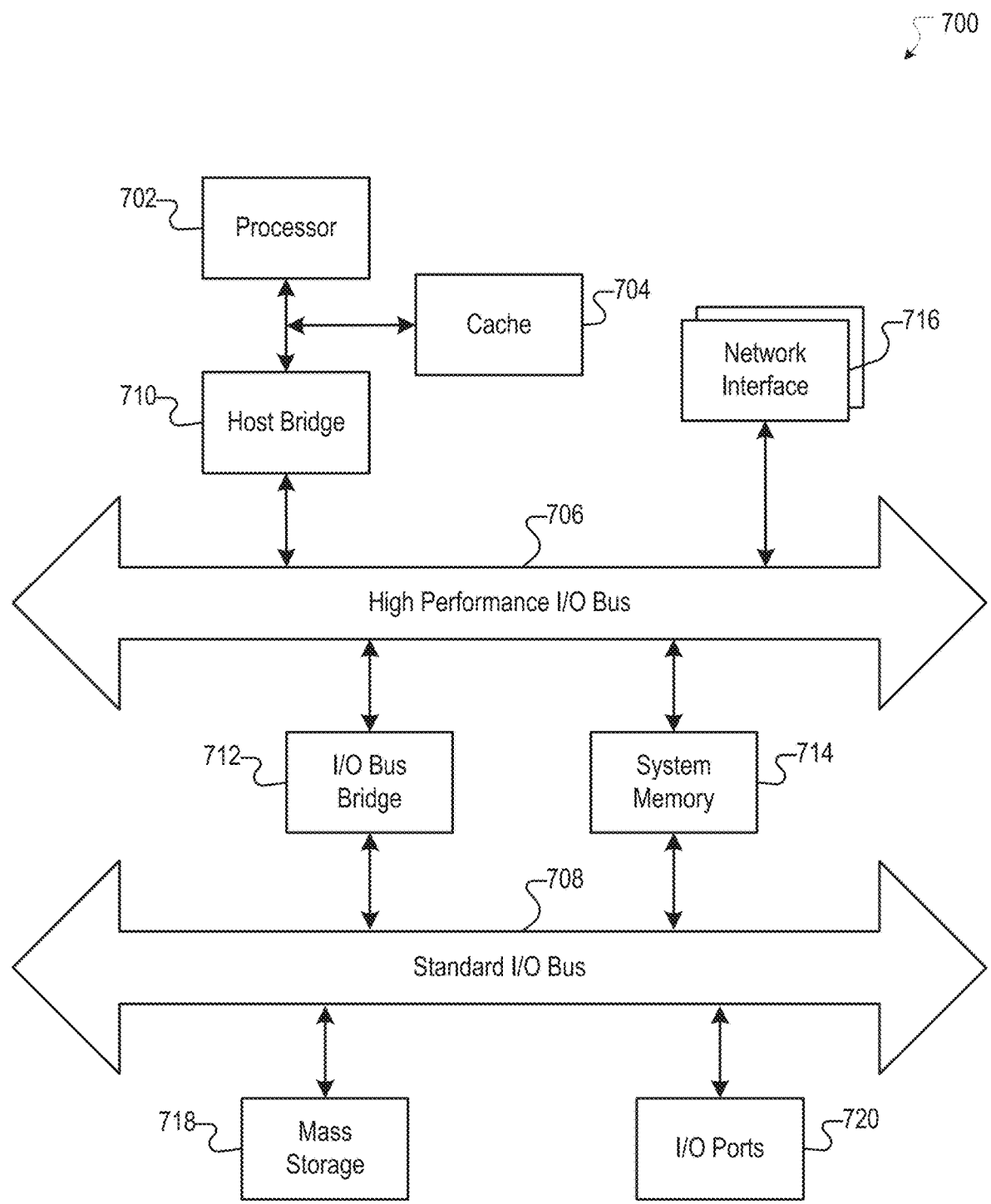
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing system, a user interface displaying a plurality of pre-defined style options for selection by a composing user on a first computing device;
receiving, by the computing system, a set of text entered by the composing user on the first computing device;
receiving, by the computing system, a style identifier associated with a pre-defined style,
wherein the style identifier is in a string format,
wherein the pre-defined style is selected from the plurality of pre-defined style options by the composing user on the first computing device, and
wherein the pre-defined style includes one or more background settings;
providing, by the computing system, a preview of the set of text to which the pre-defined style is applied; and
transmitting, by the computing system, a first string comprising the set of text entered by the composing user and a second string comprising the style identifier to a viewing user on a second computing device for rendering of a stylized text post on the second computing device based on the first string and the second string.

2. The computer-implemented method of claim 1, wherein the second string comprising the style identifier is transmitted to the second computing device as metadata associated with the stylized text post.

3. The computer-implemented method of claim 1, wherein the pre-defined style comprises one or more style settings to be applied to the stylized text post.

4. The computer-implemented method of claim 3, wherein the one or more style settings comprise one or more background settings to be applied to the stylized text post.

5. The computer-implemented method of claim 3, wherein the one or more style settings comprise one or more text settings to be applied to the stylized text post.

6. The computer-implemented method of claim 1, wherein the stylized text post is not associated with any image or video.

7. The computer-implemented method of claim 1, wherein the pre-defined style is a pre-defined style selected by the composing user from a plurality of pre-defined style options.

8. The computer-implemented method of claim 1, further comprising receiving an indication that the stylized text post is to be presented in a news feed comprising a plurality of content items displayed on the second computing device, wherein
the transmitting the first string comprising the set of text entered by the composing user and the second string comprising the style identifier to the viewing user on the second computing device is performed in response to the receiving the indication that the stylized text post is to be presented on the news feed displayed on the second computing device.

9. The computer-implemented method of claim 8, wherein an animation associated with the stylized text post is initiated when the stylized text post comes into view within the news feed displayed on the second computing device.

10. A system comprising:
at least one processor; and
a memory storing instructions that, when executed by the at least one processor, cause the system to perform a method comprising:
providing a user interface displaying a plurality of pre-defined style options for selection by a composing user on a first computing device;
receiving a set of text entered by the composing user on the first computing device;
receiving a style identifier associated with a pre-defined style,
wherein the style identifier is in a string format,
wherein the pre-defined style is selected from the plurality of pre-defined style options by the composing user on the first computing device, and
wherein the pre-defined style includes one or more background settings;
providing a preview of the set of text to which the pre-defined style is applied; and
transmitting a first string comprising the set of text entered by the composing user and a second string comprising the style identifier to a viewing user on a second computing device for rendering of a stylized text post on the second computing device based on the first string and the second string.

11. The system of claim 10, wherein the second string comprising the style identifier is transmitted to the second computing device as metadata associated with the stylized text post.

12. The system of claim 10, wherein the pre-defined style comprises one or more style settings to be applied to the stylized text post.

13. The system of claim 12, wherein the one or more style settings comprise one or more background settings to be applied to the stylized text post.

14. A non-transitory computer-readable storage medium including instructions that, when executed by at least one processor of a computing system, cause the computing system to perform a method comprising:
providing a user interface displaying a plurality of pre-defined style options for selection by a composing user on a first computing device;
receiving a set of text entered by the composing user on the first computing device;
receiving a style identifier associated with a pre-defined style,
wherein the style identifier is in a string format,
wherein the pre-defined style is selected from the plurality of pre-defined style options by the composing user on the first computing device, and
wherein the pre-defined style includes one or more background settings;
providing a preview of the set of text to which the pre-defined style is applied; and
transmitting a first string comprising the set of text entered by the composing user and a second string comprising the style identifier to a viewing user on a second computing device for rendering of a stylized text post on the second computing device based on the first string and the second string.

15. The non-transitory computer-readable storage medium of claim 14, wherein the second string comprising the style identifier is transmitted to the second computing device as metadata associated with the stylized text post.

16. The non-transitory computer-readable storage medium of claim 14, wherein the pre-defined style comprises one or more style settings to be applied to the stylized text post.

17. The non-transitory computer-readable storage medium of claim 16, wherein the one or more style settings comprise one or more background settings to be applied to the stylized text post.

* * * * *